G. MARCONI.
TRANSMITTER FOR WIRELESS TELEGRAPHY.
APPLICATION FILED JULY 20, 1908.
1,148,521.  Patented Aug. 3, 1915.
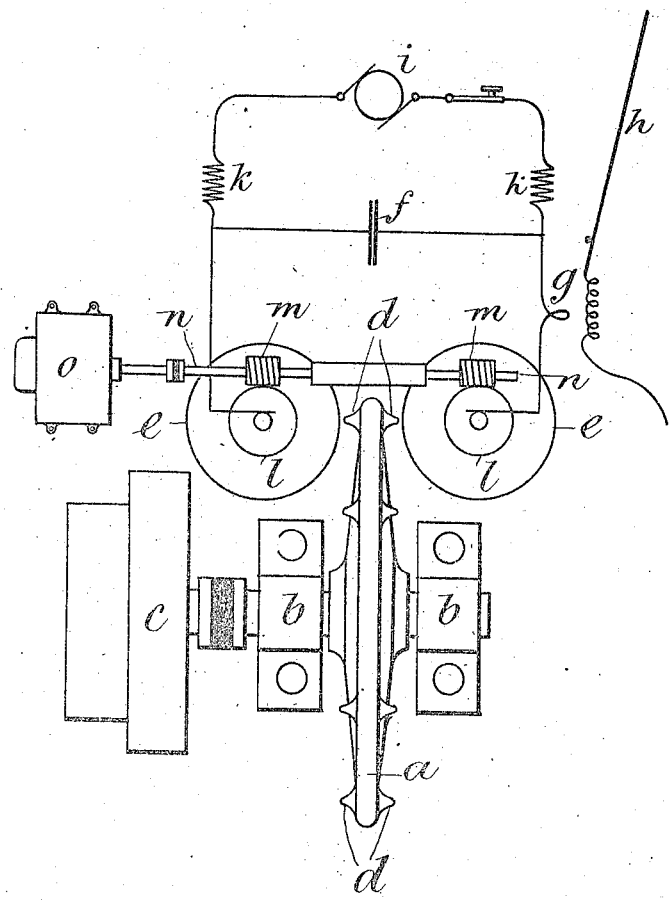
Witnesses.
Edward W. Vaill Jr.
James J. Cosgrove
Inventor.
Guglielmo Marconi
by Betts, Sheffield, Bentley & Betts
his Attorneys

UNITED STATES PATENT OFFICE.

GUGLIELMO MARCONI, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

TRANSMITTER FOR WIRELESS TELEGRAPHY.

1,148,521.   Specification of Letters Patent.   Patented Aug. 3, 1915.

Application filed July 20, 1908. Serial No. 444,305.

*To all whom it may concern:*

Be it known that I, GUGLIELMO MARCONI, LL. D., D. Sc., a subject of the King of Italy, residing at Watergate House, Adelphi, London, England, have invented new and useful Improvements in Transmitters for Wireless Telegraphy, of which the following is a specification.

According to this invention, each of the plates of a condenser is respectively connected to one of a pair of insulated revolving disks or spheres of metal situated at such a distance apart as not to allow a discharge to pass when the condenser is charged, and the gap between the disks or spheres is more or less bridged at regular intervals by a piece or pieces of metal moving rapidly between the two disks. These bridging pieces are preferably formed of pegs or studs attached to a third disk which is made to revolve between the disks first mentioned. The condenser is charged to a sufficiently high potential by a generator of continuous or alternating currents, and in the connections to said generator it is desirable to place inductive resistances.

The accompanying diagram shows in plan a transmitting apparatus made in accordance with this invention.

$a$ is a metal disk which is carried on a shaft with an insulating coupling in insulated bearings $b$, and is capable of being rotated at a very high speed from an electric motor, turbine or other convenient machine $c$.

$d\,d$ are copper studs or pegs. In the preferred embodiment of my invention these studs are arranged opposite one another in pairs around the periphery of the disk, the whole being of course made strong enough to stand very rapid rotation.

$e\,e$ are rotating disks carried on insulating supports, one on each side of the disk $a$, and so placed that the studs $d\,d$ pass very close to them when the disk is rotated. The disks $e$ are connected by means of suitable brush contacts to a condenser $f$ and inductance $g$, this oscillation circuit being connected either inductively as shown, or else conductively to an aerial conductor or antenna $h$ which is connected to earth or to a capacity in the usual way. The capacity of the condenser $f$ and the inductance of this oscillation circuit, are of such values that the circuit has a period of electrical resonance of the desired frequency. Each plate of the condenser is connected to a generator $i$, suitable inductances or resistances $k$ being included in the connections.

The disks $e\,e$ are rotated at a sufficient speed by any suitable means to obviate burning or pitting their surfaces, for instance by means of worm wheels $l$ gearing with worms $m$ or on a spindle $n$ rotated by an electric motor $o$ through an insulating coupling.

In order to obtain the best results, it is necessary to give to the inductances $k\,k$ and to the capacity of the condenser $f$, such values that the natural time period of the oscillations in this circuit shall be equal to or some exact fraction of the time interval which elapses between the passage of the two successive pairs of studs between the disks $e$.

At the occurrence of each discharge the condenser is cut out of circuit, and when the discharge stops it is inserted again and is charged by the generator with oscillations, the time period of which is approximately equal to $$2\pi\sqrt{CL}$$

where C is the capacity of the condenser in farads, and L is the whole inductance in henries, such inductance L including that of the alternator or transformer if an alternating current generator be employed or of the dynamo armature if a continuous current generator be employed.

The time interval between the passage of two pairs of studs between the revolving disks is equal to 1/NX where N is the number of revolutions of the disk per second and X is the number of pairs of studs. The right value of the inductance $k$ to be inserted can therefore be determined from the equation $$2m\pi\sqrt{CL}=1/NX$$

where $m$ is an integer.

It is essential that the speed of the insulated disk carrying the studs should be considerable. Good results have been obtained with disks 2 feet in diameter revolving at the rate of 50 revolutions per second, but a higher speed than this would be better. A suitable speed for the disks $e$, which may be a foot in diameter, is, say, 10 revolutions per minute.

By means of this invention it is possible efficiently to utilize a large amount of electrical power and to emit oscillatioms in regular groups so as to produce in a telephonic receiver a readily recognizable note which makes it easy to differentiate between signals emanating from the transmitting stations and noises caused by atmospheric electrical disturbances. By this invention it is moreover possible to obtain very efficient resonance by means of appropriate receivers which are tuned to the emitted groups of electric waves.

What I claim is:

1. In a transmitter for wireless telegraphy, the combination of moving spark terminals so arranged that a gap is left between them, an insulated disk, studs located thereon and so arranged that they can bridge the gap, and means for causing the disk to rotate rapidly.

2. In a transmitter for wireless telegraphy, the combination of a generator, a condenser charged thereby, a pair of terminals connected to the condenser, an inductance in series with the condenser and terminals, means for rotating the terminals, and means for bridging the gap between the terminals at intervals bearing an integral ratio to the electrical time period of the circuit containing the condenser and the generator.

3. In a transmitter for wireless telegraphy, the combination of a generator, a condenser charged thereby, a pair of terminals connected to the condenser, an inductance in series with the condenser and terminals, means for rotating the terminals, an insulated disk, means for rapidly rotating the disk and studs located at regular intervals upon the disk and adapted to bridge the gap between the terminals at intervals bearing an integral ratio to the electrical time period of the circuit containing the condenser and the generator.

GUGLIELMO MARCONI.

Witnesses:
HENRY W. ALLEN,
W. S. ENTWISTLE.